(12) United States Patent
Kotani et al.

(10) Patent No.: US 11,945,962 B2
(45) Date of Patent: Apr. 2, 2024

(54) CATIONIC ELECTRODEPOSITION COATING COMPOSITION AND METHOD FOR FORMING CURED ELECTRODEPOSITION COATING FILM

(71) Applicant: NIPPON PAINT AUTOMOTIVE COATINGS CO., LTD., Osaka (JP)

(72) Inventors: Masayuki Kotani, Hirakata (JP); Yuko Hasegawa, Hirakata (JP); Yasuyuki Furuya, Hirakata (JP); Keigo Obata, Hirakata (JP); Keisuke Tsutsui, Hirakata (JP); Hiroki Arai, Hirakata (JP); Hiroyoshi Yamazaki, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 886 days.

(21) Appl. No.: 16/975,810

(22) PCT Filed: Dec. 12, 2019

(86) PCT No.: PCT/JP2019/048761
§ 371 (c)(1),
(2) Date: Aug. 26, 2020

(87) PCT Pub. No.: WO2020/129817
PCT Pub. Date: Jun. 25, 2020

(65) Prior Publication Data
US 2020/0407590 A1   Dec. 31, 2020

(30) Foreign Application Priority Data

Dec. 18, 2018 (JP) ................................. 2018-236635

(51) Int. Cl.
| | | |
|---|---|---|
| *C09D 163/00* | (2006.01) | |
| *C09D 183/00* | (2006.01) | |
| *C08K 3/04* | (2006.01) | |
| *C08K 3/34* | (2006.01) | |
| *C08K 5/5415* | (2006.01) | |

(52) U.S. Cl.
CPC .............. *C09D 163/00* (2013.01); *C08K 3/04* (2013.01); *C08K 3/346* (2013.01); *C08K 5/5415* (2013.01); *C09D 183/00* (2013.01)

(58) Field of Classification Search
CPC ...... C09D 183/00; C09D 183/04; C08L 83/04
See application file for complete search history.

(56) References Cited

U.S. PATENT DOCUMENTS

| | | | |
|---|---|---|---|
| 4,981,759 A | | 1/1991 | Nakatani et al. |
| 5,100,962 A | * | 3/1992 | Sawada ................ C09D 133/08 |
| | | | 428/447 |
| 5,441,995 A | | 8/1995 | Ohgaki et al. |
| 5,569,707 A | * | 10/1996 | Blum ................ C08G 18/6611 |
| | | | 524/591 |

FOREIGN PATENT DOCUMENTS

| | | | |
|---|---|---|---|
| DE | 3814853 | 11/1988 | |
| EP | 0 255 727 | 2/1988 | |
| JP | 63-42397 | 2/1988 | |
| JP | 05-140489 | 6/1993 | |
| JP | 6-346008 | 12/1994 | |
| JP | 8-151543 | 6/1996 | |
| JP | 2006-116466 | 5/2006 | |
| JP | 2010-83933 | 4/2010 | |
| JP | 2012-92293 | 5/2012 | |
| JP | 2018-178082 | 11/2018 | |
| KR | 10-2006-0078983 A * | 7/2006 | .......... C09D 175/04 |
| KR | 10-0773861 A * | 11/2007 | .......... C09D 133/06 |
| KR | 10-0948993 B1 * | 3/2010 | .............. B05D 1/36 |
| WO | 2004/101103 | 11/2004 | |
| WO | 2017/111112 | 6/2017 | |

OTHER PUBLICATIONS

KR 10-0773861 A (Nov. 6, 2007); machine translation. (Year: 2007).*
English translation of International Preliminary Report on Patentability (Chapter I) dated Jun. 25, 2021 in International (PCT) Application No. PCT/JP2019/048761.
Notice of Reasons for Refusal dated Dec. 8, 2020 in corresponding Japanese Patent Application No. 2018-236635, with Machine Translation.
International Search Report (ISR) dated Feb. 18, 2020 in corresponding International (PCT) Application No. PCT/JP2019/048761.
Extended European Search Report dated Feb. 18, 2022 in corresponding European Patent Application No. 19898110.2.
Office Action dated Nov. 10, 2020 in corresponding Japanese Patent Application No. 2018-236635, with Machine Translation.

* cited by examiner

*Primary Examiner* — Rip A Lee
(74) *Attorney, Agent, or Firm* — Wenderoth, Lind & Ponack, L.L.P.

(57) ABSTRACT

The present invention provides a cationic electrodeposition coating composition that has both good anti-cissing property and good coating film appearance. This is a cationic electrodeposition coating composition containing a silicone compound (A) having an SP value of more than 10.5 and 15.0 or less, and a film forming resin (B), wherein the silicone compound (A) is contained in an amount of 0.01 parts by mass or more and 4.5 parts by mass or less per 100 parts by mass of the resin solid content of the film forming resin (B). For example, the silicone compound (A) is at least one species selected from the group consisting of a polyether modified silicone compound (A-1), a polyester modified silicone compound (A-2), and a polyacrylic modified silicone compound (A-3).

5 Claims, No Drawings

CATIONIC ELECTRODEPOSITION COATING COMPOSITION AND METHOD FOR FORMING CURED ELECTRODEPOSITION COATING FILM

TECHNICAL FIELD

The present disclosure relates to a cationic electrodeposition coating composition and a method for forming a cured electrodeposition coating film.

BACKGROUND ART

The occurrence of cissing due to the contamination of pollutants is a problem with cationic electrodeposition coating compositions.

Patent Literature 1 discloses a pigment dispersing paste for electrodeposition coating materials which comprise a pigment dispersing resin, cellulose, an extender pigment, and water. According to Patent Literature 1, it is attempted to improve anti-cissing property by incorporating a prescribed amount of the extender pigment.

CITATION LIST

Patent Literature

Patent Literature 1: JP-A-2012-092293

SUMMARY OF INVENTION

Technical Problems

In recent years, cationic electrodeposition coating compositions have been required to have both good anti-cissing property and good coating film appearance. Since the invention according to Patent Literature 1 aims to improve the anti-cissing property (also referred to as cissing resistance), coating film appearance may be poor, for example, coating film smoothness may be poor or coating unevenness may occur.

Further, in Patent Literature 1, improvement of the anti-cissing properties is performed by using a gelled fine particle polymer having a specific structure. However, since the gelled fine particle polymer described in Patent Literature 1 is a polymer formed by intra-particle crosslinking, deterioration of coating film appearance, such as deterioration of coating film smoothness, may occur.

As described above, in general, when a cationic electrodeposition coating composition is improved in anti-cissing property, the coating film appearance tends to be poor, for example, coating film smoothness tends to be poor or coating unevenness tends to occur. On the other hand, an attempt to achieve good coating film appearance, such as good coating film smoothness or no coating unevenness, tends to result in poor anti-cissing property.

Thus, good anti-cissing property and good coating film appearance, such as good coating film smoothness or no coating unevenness, are in a trade-off relationship, and there is a demand for a cationic electrodeposition coating composition that can simultaneously derive good anti-cissing property and good coating film appearance.

In view of the above problems, the present disclosure aims to provide a cationic electrodeposition coating composition that can lead to both good anti-cissing property and good coating film appearance, such as good coating film smoothness and no coating unevenness. The present disclosure also provides a method for forming a cured electrodeposition coating film using a prescribed cationic electrodeposition coating composition.

Solutions to Problems

The present disclosure provides the following embodiments to solve the aforementioned problems.

[1] The cationic electrodeposition coating composition of the present disclosure comprises:
a silicone compound (A) having an SP value of more than 10.5 and 15.0 or less, and
a film forming resin (B),
wherein the silicone compound (A) is contained in an amount of 0.01 parts by mass or more and 4.5 parts by mass or less per 100 parts by mass of the resin solid content of the film forming resin (B).

[2] In one embodiment, in the cationic electrodeposition coating composition, the SP value of the silicone compound (A) is 12.0 or more and 15.0 or less.

[3] In one embodiment, in the cationic electrodeposition coating composition, the silicone compound (A) is at least one species selected from the group consisting of a polyether modified silicone compound (A-1), a polyester modified silicone compound (A-2), and a polyacrylic modified silicone compound (A-3).

[4] In one embodiment, the cationic electrodeposition coating composition contains the silicone compound (A) in an amount of 0.04 parts by mass or more and 4.5 parts by mass or less per 100 parts by mass of the resin solid content of the film forming resin (B).

[5] In one embodiment, in the cationic electrodeposition coating composition, the silicone compound (A) is soluble or dispersible in an aqueous solvent.

[6] In one embodiment, the present disclosure provides a method for forming a cured electrodeposition coating film, comprising: forming an uncured electrodeposition coating film by immersing an article to be coated in the cationic electrodeposition coating composition described above and performing electrodeposition coating;
and heat-curing the uncured electrodeposition coating film to form a cured electrodeposition coating film on the article

Advantageous Effects of Invention

The cationic electrodeposition coating composition according to the present disclosure can form a coating film having both good anti-cissing property and good coating film appearance. Furthermore, when using the method for forming a cured electrodeposition coating film, it is possible to form a cured electrodeposition coating film having both good anti-cissing property and good coating film appearance.

DESCRIPTION OF EMBODIMENTS

The background of completing the cationic electrodeposition coating composition according to the present disclosure will be described.

For example, when a coating film is formed using a cationic electrodeposition coating composition, there may occur cissing (or sometimes called "craters") of the coating film due to the oil that may remain on article to be coated such as a steel sheet, and cissing of the coating film due to the oil that may exist in coating equipment, a drying furnace, etc.

For example, in order to prevent cissing, an anti-cissing agent containing an acrylic resin as a main component is used. After forming an electrodeposition coating film from an electrodeposition coating composition containing such an anti-cissing agent, a topcoat coating film, etc. may be formed by further applying a coating composition such as a topcoat coating composition.

Incidentally, the coating composition to be applied on the electrodeposition coating film, for example, a topcoat coating composition is constantly improved and may contain various components. Thus, the electrodeposition coating composition is not only required to have good anti-cissing property and good coating film appearance, but also required to improve the adhesion with a coating film formed from a new coating composition to be applied to the electrodeposition coating film.

However, when an electrodeposition coating composition containing an acrylic resin anti-cissing agent is used, it is still necessary to improve anti-cissing property and adhesion.

Furthermore, it is also necessary to reduce the amount of solvent to be used, thereby reducing the load on the environment.

The present inventors diligently studied in order to solve the above problems of the prior art and, as a result, they accomplished the present invention that can form a coating film having both good anti-cissing property and good coating film appearance such as good coating film smoothness and no coating unevenness, and can exhibit good adhesion to various coating compositions.

Cationic Electrodeposition Coating Composition

The cationic electrodeposition coating composition according to the present disclosure comprises a silicone compound (A) having an SP value of more than 10.5 and 15.0 or less, and a film forming resin (B), wherein the silicone compound (A) is contained in an amount of 0.01 parts by mass or more and 4.5 parts by mass or less per 100 parts by mass of the resin solid content of the film forming resin (B).

Each composition will be described below.

Silicone Compound (A)

The silicone compound (A) according to the present disclosure has an SP value of more than 10.5 and the SP value is 15.0 or less. Further, the cationic electrodeposition coating composition according to the present disclosure contains the silicone compound (A) in an amount of 0.01 parts by mass or more and 4.5 parts by mass or less per 100 parts by mass of the resin solid content of the film forming resin (B).

The electrodeposition coating composition of the present disclosure contains such a prescribed silicone compound in a prescribed amount, and thus can form a coating film having good anti-cissing property and good coating film appearance such as good coating film smoothness and avoidance of coating unevenness. Furthermore, it can exhibit good coating material stability, for example, good filterability and suppression of seeding.

Although it should not be construed as being limited to a particular theory, it is considered that by containing the specific silicone compound (A) according to the present disclosure in a specific amount, the cationic electrodeposition coating composition of the present disclosure can stably exist in an aqueous system and has good coating material stability.

More specifically, the electrodeposition coating composition of the present disclosure contains a prescribed silicone compound (A) in a prescribed amount, and thus it can exhibit good anti-cissing property even when the mechanisms of the existence of oil are different as shown in the bumping oil cissing property evaluation and the mixed oil cissing property evaluation described below.

Thus, it can exhibit good anti-cissing property also against the oil derived from devices to be used in drying and curing steps, etc., such as an indirect furnace or a drying furnace, namely, the oil that may be mixed in after coating and before curing. For example, the oil that may be mixed in after coating and before curing may be mixed in at a high temperature such as around the baking temperature.

Furthermore, when an oil is mixed in the coating composition, good anti-cissing property can be exhibited even when the coating film is formed under the condition that the oil can remain on an article to be coated.

In addition, the resulting electrodeposition coating film can exhibit good appearance, and, for example, it is possible to suppress the generation of seeds (impurities like small projections). It can also have a uniform coating film surface and have good coating film appearance such as no coating unevenness.

Furthermore, the electrodeposition coating composition of the present disclosure has good coating material stability, for example, stability in an aqueous system. Moreover, when the cationic coating composition is produced, the silicone compound (A) according to the present disclosure can be dispersed in an aqueous solvent without being diluted with a solvent, so that the load on the environment can be reduced.

Furthermore, when a known coating composition, for example, a topcoat coating composition is applied to and cured on an electrodeposition coating film formed from the cationic electrodeposition coating composition of the present disclosure, the resulting electrodeposition coating film and the topcoat coating film can exhibit good adhesion therebetween.

Such effects can be achieved even within the numerical range described later.

The silicone compound (A) according to the present disclosure has an SP value of more than 10.5 and the SP value is 15.0 or less. In one embodiment, the silicone compound (A) has an SP value of 11.0 or more and 15.0 or less, for example, an SP value of 12.0 or more and 15.0 or less. In another embodiment, the silicone compound (A) has an SP value of 12.3 or more and less than 15.0, for example, an SP value of 12.5 or more and less than 15.0.

When the SP value of the silicone compound (A) is within such a range, the appearance of a resulting coating film is not impaired and the coating film has good anti-cissing property even under various conditions of the oil contamination route.

Furthermore, for example, good adhesion can be exhibited with a topcoat coating film or the like.

When the SP value of the silicone compound (A) is within such a range, good anti-cissing property can be ensured, and moreover, a coating composition having the prescribed composition according to the present disclosure can exhibit good coating material stability.

Moreover, since the cationic electrodeposition coating composition of the present invention contains the silicone compound (A) having a prescribed SP value, it is also superior in stability in an aqueous system. It has also good filterability and can suppress seeding.

Although it should not be construed as being limited to a particular theory, it is considered that the SP value of the silicone compound (A) is within such a range, so that good anti-cissing property and high quality appearance can be achieved without impairing coating material stability.

The SP value is an abbreviation of solubility parameter and is a measure of solubility. The larger the SP value, the higher the polarity, while the smaller the value thereof, the lower the polarity.

For example, the SP value can be measured by the following method [reference: SUH, CLARKE, J.P.S.A-1, 5, 1671-1681 (1967)].

As a sample, a mixture prepared by weighing 0.5 g of an organic solvent in a 100 ml beaker, adding 10 ml of acetone with a whole pipette, and dissolving them with a magnetic stirrer is used. A poor solvent is dropped into this sample using a 50 ml burette at a measurement temperature of 20° C., and the point at which turbidity is generated is defined as a dropping amount. As to the poor solvent, ion-exchanged water is used as a high SP poor solvent, whereas n-hexane is used as a low SP poor solvent, and the clouding point of each of the solvents is measured. The SP value δ of an organic solvent is given by the following calculation formula.

$$\delta = (V_{ml}^{1/2}\delta_{ml} + V_{mh}^{1/2}\delta_{mh})/(V_{ml}^{1/2} + V_{mh}^{1/2})$$

$$V_m = V_1 V_2/(\varphi_1 V_2 + \varphi_2 V_1)$$

$$\delta_m = \varphi_1 \delta_1 + \varphi_2 \delta_2$$

Vi: the molecular volume of the solvent (ml/mol)
φi: the volume fraction of each solvent at the clouding point
δi: the SP value of the solvent
ml: low SP poor solvent mixed system
mh: high SP poor solvent mixed system Incidentally, when the silicone compound (A) contains a plurality of types of silicone compound (A), the SP value of the silicone compound (A) can be determined by calculating an average value using the SP values of the respective compounds based on the solid mass ratio in the silicone compound (A) component.

The cationic electrodeposition coating composition according to the present disclosure contains the silicone compound (A) in an amount of 0.01 parts by mass or more and 4.5 parts by mass or less per 100 parts by mass of the resin solid content of the film forming resin (B). In one embodiment, the cationic electrodeposition coating composition contains the silicone compound (A) in an amount of 0.04 parts by mass or more and 4.5 parts by mass or less, for example, 0.04 parts by mass or more and 4.0 parts by mass or less, per 100 parts by mass of the resin solid content of the film forming resin (B).

In one embodiment, the cationic electrodeposition coating composition contains the silicone compound (A) in an amount of 0.04 parts by mass or more and 3.0 parts by mass or less, for example, 0.04 parts by mass or more and 2.5 parts by mass or less, and in one embodiment, 0.05 parts by mass or more and 2.0 parts by mass or less, per 100 parts by mass of the resin solid content of the film forming resin (B).

When the amount of the silicone compound (A) is within such a range, the appearance of a resulting coating film is not impaired, and the coating film has good anti-cissing property against various cissing differing in mechanism that may occur in evaluation of mixed oil cissing, evaluation of bumping oil cissing, etc. Further, good adhesion can be exhibited with various coating films such as a topcoat coating film.

In addition, the cationic electrodeposition coating composition of the present invention is superior also in stability in an aqueous system, has good filterability, and can suppress seeding.

In the present description, 100 mass of the resin solid content of the film forming resin (B) means the total amount of the solid content mass of the resin component that forms a coating film via a curing reaction after electrodeposition coating.

For example, when the film forming resin (B) contains a plurality of types of resin, 100 parts by mass of the resin solid content contained in the film forming resin (B) means that the total of the solid contents of the plurality of types of resin that form a coating film after curing is 100 parts by mass.

In one embodiment, when the film forming resin (B) contains an aminated resin (B-1) and a curing agent (B-2), 100 parts by mass of the resin solid content of the film forming resin (B) means that the total of the resin solid content of the aminated resin (B-1) and the resin solid content of the curing agent (B-2) is 100 parts by mass.

For example, the specific silicone compound (A) according to the present disclosure is soluble or dispersible in an aqueous solvent. In one embodiment, the specific silicone compound (A) according to the present disclosure can be easily dispersed as a single substance in water.

Although it should not be construed as being limited to a particular theory, it is considered that since the specific silicone compound (A) according to the present disclosure has a prescribed SP value, it can stably exist in an aqueous system, is soluble or dispersible in an aqueous solvent, and can be easily dispersed as a single substance in water.

In the present description, that the silicone compound (A) is soluble or dispersible in an aqueous solvent means that the silicone compound (A) according to the present disclosure can be easily dissolved or uniformly dispersed when being mixed in a prescribed amount with an aqueous solvent at normal temperature. Further, that the silicone compound (A) is easily dispersed as a single substance in water means that the silicone compound (A) can be uniformly dispersed in an aqueous solvent at normal temperature without using a dispersant, a surfactant, or the like.

Thanks to the fact that the silicone compound (A) has such properties, good coating material stability is exhibited, for example, stability in an aqueous system is exhibited. Moreover, since the silicone compound (A) can be dispersed in an aqueous solvent without being diluted with a solvent during the production of the cationic coating composition, the load on the environment can be reduced.

In one embodiment, the silicone compound (A) has polysiloxane in the main skeleton. For example, the polysiloxane has 3 to 20 Si atoms, for example, 3 to 10 Si atoms, in its molecule. In one embodiment, the silicone compound (A) has polydimethylsiloxane in the main skeleton.

In one embodiment, the silicone compound (A) is at least one species selected from the group consisting of a polyether modified silicone compound (A-1), a polyester modified silicone compound (A-2), and a polyacrylic modified silicone compound (A-3). The cationic electrodeposition coating composition of the present disclosure may contain these modified silicone compounds singly or in combination.

By containing such a silicone compound (A), the cationic electrodeposition coating composition of the present disclosure can have both better anti-cissing property and better coating film appearance, and can exhibit better coating material stability.

In one embodiment, the silicone compound (A) contains a polyether modified silicone compound (A-1) and at least one selected from a polyester modified silicone compound (A-2) and a polyacrylic modified silicone compound (A-3).

The silicone compound (A) can have more stable wettability by containing such a combination.

Furthermore, the cationic electrodeposition coating composition of the present disclosure having such a silicone compound (A) can have superior anti-cissing property. It can also exhibit better stability of the coating material. Furthermore, the adhesion between an electrodeposition coating film formed from the cationic electrodeposition coating composition of the present disclosure and a topcoat coating film can be further improved.

Examples of the polyether modified silicone compound (A-1) include compounds in which a polyether chain is introduced into terminals and/or side chains of polysiloxane. For example, the polysiloxane may further have a substituent other than the polyether chain.

In one embodiment, the polyether modified silicone compound (A-1) is a compound in which a polyether chain is introduced into side chains of polysiloxane such as polydimethylsiloxane.

By containing the polyether modified silicone compound (A-1), the cationic electrodeposition coating composition of the present disclosure has such effects as better anti-cissing property and better coating film appearance, for example, good coating film smoothness and no coating unevenness. It can also exhibit better stability of the coating material.

Furthermore, the adhesion between an electrodeposition coating film formed from the cationic electrodeposition coating composition of the present disclosure and a topcoat coating film can be further improved.

Examples of the polyester modified silicone compound (A-2) include compounds in which a polyester chain is introduced into terminals and/or side chains of polysiloxane. For example, the polysiloxane may further have a substituent other than the polyester chain.

In one embodiment, the polyester modified silicone compound (A-2) is a compound in which a polyester chain is introduced into side chains of polysiloxane such as polydimethylsiloxane.

By containing the polyester modified silicone compound (A-2), the cationic electrodeposition coating composition of the present disclosure has better anti-cissing property and better coating film appearance. It can also exhibit better stability of the coating material. Furthermore, the adhesion between an electrodeposition coating film formed from the cationic electrodeposition coating composition of the present disclosure and a topcoat coating film can be further improved.

Examples of the polyacrylic modified silicone compound (A-3) include compounds in which a polyacrylic chain is introduced into terminals and/or side chains of polysiloxane. For example, the polysiloxane may further have a substituent other than the polyacrylic chain.

In one embodiment, the polyacrylic modified silicone compound (A-3) is a compound in which a polyacrylic chain is introduced into side chains of polysiloxane such as polydimethylsiloxane.

By containing the polyacrylic modified silicone compound (A-3), the cationic electrodeposition coating composition of the present disclosure has such effects as better anti-cissing property and better coating film appearance. It can also exhibit better stability of the coating material. Furthermore, the adhesion between an electrodeposition coating film formed from the cationic electrodeposition coating composition of the present disclosure and a topcoat coating film can be further improved.

Film Forming Resin (B)

The film forming resin (B) according to the present disclosure is not particularly limited, and may comprise a film forming resin (B) to be commonly used in cationic electrodeposition coating compositions. For example, the film forming resin (B) comprises an aminated resin (B-1) and a curing agent (B-2).

In one embodiment, when the film forming resin (B) contains an aminated resin (B-1) and a curing agent (B-2), 100 parts by mass of the resin solid content of the film forming resin (B) means that the total of the resin solid contents thereof is 100 parts by mass. Besides this example, when the film forming resin (B) contains a plurality of types of resin, 100 parts by mass of the resin solid content contained in the film forming resin (B) means that the total of the solid contents of the plurality of types of resin is 100 parts by mass.

Aminated Resin (B-1)

The aminated resin (B-1) is included in the film forming resin (B) that constitutes an electrodeposition coating film.

The aminated resin (B-1) may be an amine-modified epoxy resin obtained by modifying oxirane rings in an epoxy resin skeleton with an amine compound. Generally, an amine-modified epoxy resin is prepared by ring-opening oxirane rings in a starting raw material resin molecule via a reaction with an amine compound such as a primary amine, secondary amine or tertiary amine and/or an acid salt thereof. Typical examples of the starting raw material resin include polyphenol polyglycidyl ether type epoxy resins, which are reaction products of polycyclic phenol compounds, such as bisphenol A, bisphenol F, bisphenol S, phenol novolac, and cresol novolac, with epichlorohydrin. Examples of other starting raw material resins include the oxazoline ring-containing epoxy resins disclosed in JP-A-H5-306327. Such epoxy resins can be prepared via a reaction of a diisocyanate compound or a bisurethane compound obtained by blocking the isocyanate groups of a diisocyanate compound with a lower alcohol such as methanol and ethanol, with epichlorohydrin.

For example, the aminated resin (B-1) may be chosen because it has chipping resistance.

The starting raw material resin may be used after being chain-extended with a bifunctional polyester polyol, a polyether polyol, a bisphenol, a dibasic carboxylic acid, or the like before the ring opening reaction of oxirane rings with an amine compound.

The starting raw material resin also may be used after being subjected to the addition of a monohydroxy compound such as 2-ethylhexanol, nonylphenol, ethylene glycol mono-2-ethylhexyl ether, ethylene glycol mono-n-butyl ether, propylene glycol mono-2-ethylhexyl ether, or a monocarboxylic acid such as octylic acid to some oxirane rings for the purpose of controlling a molecular weight or an amine equivalent or improving heat flowability, before the ring opening reaction of oxirane rings with an amine compound.

An amine-modified epoxy resin is obtained by reacting oxirane rings of the above epoxy resin with an amine compound. Examples of the amine compound to be reacted with oxirane rings include primary amines and secondary amines. If an epoxy resin is reacted with a secondary amine, an amine-modified epoxy resin having a tertiary amino group is obtained. If an epoxy resin is reacted with a primary amine, an amine-modified epoxy resin having a secondary amino group is obtained. Furthermore, by using a secondary amine having a blocked primary amine, an amine-modified epoxy resin having a primary amino group can be prepared. For example, the preparation of an amine-modified epoxy resin having a primary amino group and a secondary amino group may be carried out by blocking the primary amino group with a ketone to form a ketimine before the reacting it with an epoxy resin, then introducing it into an epoxy resin, and then performing deblocking. As the amine to be reacted with the oxirane rings, a tertiary amine may optionally be used in combination.

As the primary amine, the secondary amine, and the tertiary amine, those described above can be used. Examples of the secondary amine having a blocked primary amine include a ketimine of aminoethylethanolamine and a diketimine of diethylenetriamine. Examples of the tertiary amine which may optionally be used include triethylamine, N,N-dimethylbenzylamine, and N,N-dimethylethanolamine. These amines may be used singly, or two or more of them may be used in combination.

The amine compound to be reacted with oxirane rings of the epoxy resin is preferably one containing 50 to 95% by mass of a secondary amine, 0 to 30% by mass of a secondary amine having a blocked primary amine, and 0 to 20% by mass of a primary amine.

The number-average molecular weight of the aminated resin (B-1) is preferably within the range of 1,000 to 5,000. The condition that the number-average molecular weight is 1,000 or more affords good physical properties of a resulting cured electrodeposition coating film such as solvent resistance and corrosion resistance. On the other hand, the condition that the number-average molecular weight is 5,000 or less makes it easy to adjust the viscosity of the aminated resin (B-1) and possible to perform smooth synthesis, and makes it easy to handle emulsification and dispersion of the resulting amine-modified epoxy resin (B-1). The number-average molecular weight of the aminated resin (B-1) is more preferably within the range of 2,000 to 3,500.

In the present description, the number-average molecular weight is a number-average molecular weight in terms of polystyrene as measured by gel permeation chromatography (GPC).

The aminated resin (B-1) preferably has an amine value within the range of 20 to 100 mg KOH/g. The condition that the amine value of the aminated resin (B-1) is 20 mg KOH/g or more leads to good emulsification-dispersion stability of the aminated resin (B-1) in an electrodeposition coating composition. On the other hand, the condition that the amine value is 100 mg KOH/g or less leads to a proper number of amino groups in a cured electrodeposition coating film and will have no possibility to lower the water resistance of a coating film. The amine value of the aminated resin (B-1) is more preferably within the range of 20 to 80 mg KOH/g.

The hydroxyl value of the aminated resin (B-1) is preferably within the range of 150 to 650 mg KOH/g. The condition that the hydroxyl value is 150 mg KOH/g or more leads to good curing of a cured electrodeposition coating film and also improves the coating film appearance. On the other hand, the condition that the hydroxyl value is 650 mg KOH/g or less leads to a proper amount of hydroxyl groups remaining in a cured electrodeposition coating film and will have no possibility to lower the water resistance of a coating film. The hydroxyl value of the aminated resin (B-1) is preferably within the range of 180 to 300 mg KOH/g.

In the electrodeposition coating composition of the present invention, thanks to the use of an aminated resin (B-1) having a number-average molecular weight within the range of 1,000 to 5,000, an amine value of 20 to 100 mg KOH/g, and a hydroxyl value of 150 to 650 mg KOH/g, superior corrosion resistance can be imparted to an article to be coated.

As the aminated resin (B-1), aminated resins (B-1) differing in amine value and/or hydroxyl value may optionally be used in combination. When two or more aminated resins (B-1) differing in amine value and hydroxyl value are used in combination, the average amine value and the average hydroxyl value calculated on the basis of the mass ratio of the aminated resins (B-1) to be used are preferably within the above-mentioned numerical values. As the aminated resins (B-1) to be used in combination, an aminated resin (B-1) having an amine value of 20 to 50 mg KOH/g and a hydroxyl value of 50 to 300 mg KOH/g and an aminated resin (B-1) having an amine value of 50 to 200 mg KOH/g and a hydroxyl value of 200 to 500 mg KOH/g are preferably used in combination. Use of such a combination affords an advantage that superior corrosion resistance can thereby be imparted because the core part of an emulsion is thereby made more hydrophobic and the shell part of the emulsion is made more hydrophilic.

The aminated resin (B-1) may contain an amino group-containing acrylic resin, an amino group-containing polyester resin, or the like.

Curing agent (B-2)

The film forming resin (B) according to the present disclosure may contain a curing agent (B-2). The curing agent (B-2) undergoes a curing reaction with the aminated resin (B-1) under heating conditions to form a coating film. As the curing agent (B-2), a melamine resin or a blocked isocyanate curing agent is suitably used. The blocked isocyanate curing agent that can be suitably used as the curing agent (B-2) can be prepared by blocking a polyisocyanate with an encapsulant.

Examples of the polyisocyanate include aliphatic diisocyanates such as hexamethylene diisocyanate (including a trimer), tetramethylene diisocyanate and trimethylhexamethylene diisocyanate; cycloaliphatic polyisocianates such as isophorone diisocyanate and 4,4'-methylene-bis-(cyclohexyl isocyanate); and aromatic diisocyanates such as 4,4'-diphenylmethane diisocyanate, tolylene diisocyanate and xylylene diisocyanate (urethanized materials, materials modified with carbodiimide, uretdione, uretonimine, biuret and/or isocyanurate).

Examples of the encapsulant that may preferably be used include monohydric alkyl (or aromatic) alcohols such as n-butanol, n-hexyl alcohol, 2-ethylhexanol, lauryl alcohol, phenol carbinol and methylphenyl carbinol; cellosolves such as ethylene glycol monohexyl ether and ethylene glycol mono-2-ethylhexyl ether; polyether-type both-ended diols such as polyethylene glycol, polypropylene glycol and polytetramethylene ether glycol phenol; polyester-type both-ended polyols obtained from a diol such as ethylene glycol, propylene glycol or 1,4-butanediol and a dicarboxylic acid such as oxalic acid, succinic acid, adipic acid, suberic acid or sebacic acid; phenols such as para-t-butylphenol and cresol; oximes such as dimethyl ketoxime, methyl ethyl ketoxime, methyl isobutyl ketoxime, methyl amyl ketoxime and cyclohexanone oxime; and lactams typified by ε-caprolactam and γ-butyrolactam.

The blocking ratio of the blocked isocyanate curing agent is preferably 100%. This affords an advantage that the storage stability of the electrodeposition coating composition is improved.

As the blocked isocyanate curing agent, a curing agent prepared by blocking an aliphatic diisocyanate with an encapsulant and a curing agent prepared by blocking an aromatic diisocyanate with an encapsulant are preferably be used in combination.

The blocked isocyanate curing agent preferentially reacts with the primary amine of the aminated resin (B-1), and further reacts with a hydroxyl group to be cured.

Examples of the melamine resin include a partially or completely methylolated melamine resin obtained by reacting melamine with formaldehyde, a partial or complete alkyl ether type melamine resin obtained by partially or completely etherifying a methylol group of a methylolated melamine resin with an alcohol component, an imino group-containing melamine resin, and mixture type melamine resins thereof. Examples of the alkyl ether type melamine resin include methylated melamine resin, butylated melamine resin, and methyl/butyl mixed alkyl type melamine resin.

As the curing agent (B-2), at least one curing agent selected from the group consisting of organic curing agents such as melamine resin or phenol resin, silane coupling agents, and metal curing agents may be used in combination with the blocked isocyanate curing agent.

In the preparation of the cationic electrodeposition coating composition according to the present disclosure, it is preferable to prepare a resin emulsion, for example, by dissolving the aminated resin (B-1) and the curing agent (B-2) in organic solvents, respectively, to prepare solutions, mixing the solutions, and then neutralizing the mixture with a neutralizing acid.

Examples of the neutralizing acid include organic acids such as methanesulfonic acid, sulfamic acid, lactic acid, dimethylol propionic acid, formic acid, and acetic acid. In the present disclosure, it is more preferable to neutralize the resin emulsion containing the aminated resin (B-1) and the curing agent (B-2) with one or more acids selected from the group consisting of formic acid, acetic acid, and lactic acid.

The neutralizing acid is more preferably used in an amount of 10 to 100%, even more preferably 20 to 70%, in the equivalent ratio of the neutralizing acid to the equivalent of the amino groups of the aminated resin (B-1). In the present description, the equivalent ratio of the neutralizing acid to the equivalent of the amino groups of the aminated resin (B-1) is taken as the neutralization ratio. When the neutralization ratio is 10% or more, the affinity to water is secured and the dispersibility in water is improved.

The content of the curing agent (B-2) is required to be an amount sufficient for reacting with a primary amino group, a secondary amino group, or an active hydrogen-containing functional group such as a hydroxyl group in the aminated resin (B-1) during curing to afford a good cured coating film. A preferred content of the curing agent (B-2) is within the range of 90/10 to 50/50, more preferably 80/20 to 65/35, in terms of the solid mass ratio of the aminated resin (B-1) to the curing agent (B-2) (aminated resin (B-1)/curing agent (B-2)). By adjusting the solid mass ratio of the aminated resin (B-1) to the curing agent (B-2), the fluidity and the curing rate of the coating film (deposited film) at the time of film formation are improved, and the coating film appearance is improved.

Pigment Dispersion Paste

The cationic electrodeposition coating composition according to the present disclosure may optionally contain a pigment dispersion paste. The pigment dispersion paste generally comprises a pigment dispersion resin and a pigment.

Pigment Dispersion Resin

The pigment dispersion resin is a resin for dispersing a pigment and, for example, it is dispersed in an aqueous medium and then used. As the pigment dispersion resin, there can be used a pigment dispersion resin having a cationic group, such as a modified epoxy resin having at least one member selected from the group consisting of a quaternary ammonium group, a tertiary sulfonium group, and a primary amine group. As the aqueous solvent, ion-exchanged water or water containing a small amount of alcohol can be used.

Pigment

The pigment is a pigment that is commonly used in electrodeposition coating compositions. Examples of the pigment include inorganic pigments and organic pigments which are usually used, for example, coloring pigments such as titanium white (titanium dioxide), carbon black, and red iron oxide; extender pigments such as kaolin, talc, aluminum silicate, calcium carbonate, mica, and clay; and antirust pigments such as iron phosphate, aluminum phosphate, calcium phosphate, aluminum tripolyphosphate, aluminum phosphomolybdate, and aluminum zinc phosphomolybdate.

Other Additives

The cationic electrodeposition coating composition of the present invention may further comprise additives commonly used in the coating material field. It is noted that the additives are contained as long as the effect of the cationic electrodeposition coating composition of the present invention, in particular, the effect of the prescribed silicone compound (A) according to the present disclosure is not impaired.

The additives may optionally include organic solvents such as ethylene glycol monobutyl ether, ethylene glycol monohexyl ether, ethylene glycol monoethylhexyl ether, propylene glycol monobutyl ether, dipropylene glycol monobutyl ether and propylene glycol monophenyl ether, drying inhibitors, surfactants such as antifoaming agents, viscosity modifiers such as acrylic resin fine particles, known anti-cissing agents, inorganic anticorrosive agents such as vanadium salts, copper, iron, manganese, magnesium, and calcium salts, etc. In addition to these, known auxiliary complexing agents, buffers, smoothing agents, stress relaxation agents, brighteners, semi-brighteners, antioxidants, ultraviolet absorbers, etc. may be blended according to the intended purpose. These additives may be added during the second mixing in the production of a resin emulsion or may be added during the production of a pigment dispersion paste or may be added during or after the mixing a resin emulsion and a pigment dispersion paste.

Electrodeposition Coating and Method for Forming Cured Electrodeposition Coating Film In another aspect, the present disclosure provides a method for forming a cured electrodeposition coating film, comprising: forming an uncured electrodeposition coating film by immersing an article to be coated in the prescribed cationic electrodeposition coating composition according to the present disclosure and performing electrodeposition coating; and heat-curing the uncured electrodeposition coating film to form a cured electrodeposition coating film on the article.

As described above, electrodeposition coating and the formation of a cured electrodeposition coating film on an article to be coated can be carried out by using the cationic electrodeposition coating composition of the present invention.

According to the method for forming a cured electrodeposition coating film of the present disclosure, since electrodeposition coating is applied to an article to be coated and a cured electrodeposition coating film is formed by using a cationic electrodeposition coating composition of the present invention containing a specific amount of a specific silicone compound, it is possible to form a coating film that exhibits good anti-cissing property and has good coating film appearance such as good coating film smoothness and no coating unevenness.

Furthermore, even when the mechanisms of the existence of oil are different, it is possible to form coating films that exhibit good anti-cissing property.

Thus, according to the method for forming a cured electrodeposition coating film of the present disclosure, it is possible to form a coating film that exhibits good anti-cissing property even for the oil derived from a device to be used in a drying and curing steps, etc. such as an indirect furnace and a drying furnace, namely, the oil that may be mixed in after coating and before curing. The oil that may be mixed in after coating and before curing may be mixed, for example, in at high temperatures such as around the baking temperature, but a coating film that also exhibits good anti-cissing property against such oil can be formed.

Furthermore, according to the method for forming a cured electrodeposition coating film of the present disclosure, when an oil is mixed in the coating composition, it is possible to form a coating film that exhibits good anti-cissing property even if the coating film is formed under the condition that the oil may remain on the article to be coated.

Moreover, according to the method for forming a cured electrodeposition coating film of the present disclosure, the cationic electrodeposition coating composition to be used has good coating material stability, for example, stability in an aqueous system. In addition, the specific silicone compound (A) according to the present disclosure can be dispersed in an aqueous solvent without being diluted with a solvent, so that the load on the environment can be reduced.

In electrodeposition coating using the cationic electrodeposition coating composition of the present disclosure, an article to be coated is immersed in the cationic electrodeposition coating composition, the article is used as a cathode, and a voltage is applied between the cathode and an anode (electrodeposition coating step). As a result, an electrodeposition coating film (uncured electrodeposition coating film) is deposited on the article to be coated.

In an electrodeposition coating step, electrodeposition coating is performed by immersing an article to be coated in an electrodeposition coating composition, and then applying a voltage of 50 to 450 V. If the applied voltage is less than 50 V, electrodeposition may be insufficiently performed, and if the applied voltage is more than 450 V, the coating film may be broken to have poor appearance. During electrodeposition coating, the bath liquid temperature of the coating composition is usually adjusted to 10 to 45° C.

The time for which the voltage is applied varies depending on electrodeposition conditions, and it may be generally 2 to 5 minutes.

The thickness of the electrodeposition coating film is adjusted preferably to a thickness that leads to a cured electrodeposition coating film finally obtained by heat curing having a thickness of 5 to 40 µm, more preferably 10 to 25 µm. When the thickness of the electrodeposition coating film is less than 5 µm, the corrosion resistance may be poor. On the other hand, when the thickness is more than 40 µm, the coating composition is wasted.

The electrodeposition coating film (uncured electrodeposition coating film) obtained as described above is subjected to an electrodeposition process, and then kept as it is or washed with water, and then heated at 120 to 260° C., preferably 140 to 220° C., for 10 to 30 minutes, whereby a heat-cured cured electrodeposition coating film is formed.

In one embodiment, the coating composition of the present disclosure can form a coating film that can afford a heat-cured electrodeposition coating film having an arithmetic average roughness (Ra(2.5)), namely, (Ra) excluding wavelengths of 2.5 mm or more, of 0.1 or more and 0.3 or less, for example, 0.15 or more and 0.25 or less. The coating composition of the present disclosure can form a coating film having an arithmetic average roughness (Ra(2.5)) within such a range, and can form a coating film having good smoothness and having an excellent appearance. For example, the arithmetic average roughness (Ra) can be measured according to JIS-B0601.

Article to be Coated

As an article to be coated with the electrodeposition coating composition of the present invention, various articles capable of being fed with electricity can be used. Examples of the usable article to be coated include cold-rolled steel sheets, hot-rolled steel sheets, stainless steels, electrogalvanized steel sheets, hot-dip galvanized steel sheets, zinc-aluminum alloy-based plated steel sheets, zinc-iron alloy-based plated steel sheets, zinc-magnesium alloy-based plated steel sheets, zinc-aluminum-magnesium alloy-based plated steel sheets, aluminum-based plated steel sheets, aluminum-silicon alloy-based steel sheets and tin-based plated steel sheets.

These articles to be coated may be articles subjected to a known chemical conversion treatment or the like.

EXAMPLES

The present disclosure will be described more specifically with reference to the following examples, but the present invention is not limited to them. In the examples, "parts" and "%" are on a mass basis unless otherwise indicated.

In the examples and comparative examples, the following were used as silicone compounds 1 to 4. The SP value was measured by the method described above.

Silicone compound 1: TEGO Wet 265 manufactured by Evonik
(SP value=12.7, polyether modified silicone compound)
Silicone compound 2: TEGO Wet 260 manufactured by Evonik
(SP value=14.8, polyether modified silicone compound)
Silicone compound 3: KF-949 manufactured by Shin-Etsu Chemical Co., Ltd.
(SP value=10.0, polyether modified silicone compound)
Silicone compound 4: TEGO Wet KL260 manufactured by Evonik
(SP value=15.3, polyether modified silicone compound)

Production Example 1: Production of Pigment Dispersion Resin

Preparation of 2-ethylhexanol Half-Blocked Isophorone Diisocyanate

A reaction vessel equipped with a stirrer, a condenser tube, a nitrogen inlet tube and a thermometer was charged with 222.0 parts of isophorone diisocyanate (hereinafter, abbreviated as IPDI), which was then diluted with 39.1 parts of methyl isobutyl ketone (MIBK), and 0.2 parts of dibutyltin dilaurate was added thereto. Thereafter, the mixture was heated to 50° C., and 131.5 parts of 2-ethylhexanol was then added dropwise under stirring in a dry nitrogen atmosphere over 2 hours, affording 2-ethylhexanol half-blocked IPDI (solid content: 90.0% by mass).

Preparation of Quaternization Agent

A reaction vessel was charged in order with 87.2 parts of dimethylethanolamine, 117.6 parts of a 75% lactic acid aqueous solution and 39.2 parts of ethylene glycol mono-n-butyl ether, which were then stirred at 65° C. for 30 minutes, and thus a quatemization agent was prepared.

Production of Pigment Dispersion Resin

A reaction vessel was charged with 710.0 parts of a bisphenol A-type epoxy resin (trade name: DER-331J, produced by The Dow Chemical Company) and 289.6 parts of bisphenol A, which were then reacted in a nitrogen atmosphere at 150 to 160° C. for 1 hour, and then cooled to 120° C., and 498.8 parts of the previously prepared 2-ethylhexanol half-blocked IPDI (MIBK solution) was then added. The reaction mixture was stirred at 110 to 120° C. for 1 hour, 463.4 parts of ethylene glycol mono-n-butyl ether was added, the mixture was cooled to 85 to 95° C., and 196.7 parts of the previously prepared quaternization agent was added. The reaction mixture was maintained at 85 to 95° C. until the acid value thereof reached 1, and then 964 parts of deionized water was added to obtain the target epoxy resin (pigment dispersion resin) having a quaternary ammonium group (solid content: 50% by mass).

Production Example 2-1: Production of Aminated Resin (B-1-1)

First, 92 parts of methyl isobutyl ketone, 940 parts of a bisphenol A-type epoxy resin (trade name: DER-331J, produced by The Dow Chemical Company), 382 parts of bisphenol A, 63 parts of octylic acid and 2 parts of dimethylbenzylamine were added, and then were reacted until the epoxy equivalent was 1110 g/eq while the temperature in the reaction vessel was held at 140° C., and then cooling was performed until the temperature in the reaction vessel was 120° C. A mixture of 78 parts of diethylenetriamine diketimine (methyl isobutyl ketone solution having a solid content of 73%) and 92 parts of diethanolamine was then added, and reacted at 120° C. for 1 hour, affording an aminated resin (cation-modified epoxy resin). The resin had a number-average molecular weight of 2,560, an amine value of 50 mg KOH/g (including an amine value derived from the primary amine of 14 mg KOH/g), and a hydroxyl value of 240 mg KOH/g.

Production Example 3-1: Production of Blocked Isocyanate Curing Agent (B-2-1)

A reaction vessel was charged with 1680 parts of hexamethylene diisocyanate (HDI) and 732 parts of MIBK, which were then heated to 60° C. A solution of 346 parts of trimethylolpropane in 1067 parts of MEK oxime was added thereto dropwise at 60° C. over 2 hours. The mixture was further heated at 75° C. for 4 hours, disappearance of an absorption based on an isocyanate group was then confirmed in IR spectrum measurement. The mixture was allowed to cool, and 27 parts of MIRK was then added, affording a blocked isocyanate curing agent (B-2-1) having a solid content of 78% by mass. The isocyanate group value was 252 mg KOH/g.

Production Example 3-2: Production of Blocked Isocyanate Curing Agent (B-2-2)

A reaction vessel was charged with 1340 parts of 4,4'-diphenylmethane diisocyanate and 277 parts of MIBK, which were then heated to 80° C., and a solution of 226 parts of c-caprolactam in 944 parts of butyl cellosolve was then added dropwise at 80° C. over 2 hours. The mixture was further heated at 100° C. for 4 hours, disappearance of an absorption based on an isocyanate group was then confirmed in IR spectrum measurement, the mixture was allowed to cool, and 349 parts of MIBK was then added, affording a blocked isocyanate curing agent (B-2-2) (solid content: 80%). The isocyanate group value was 251 mg KOH/g.

Production Example 4-1: Production of Resin Emulsion 1

First, 350 parts (solid content) of the aminated resin (B-1-1) obtained in Production Example 2-1 was mixed with 75 parts (solid content) of the blocked isocyanate curing agent (B-2-1) obtained in Production Example 3-1 and 75 parts (solid content) of the blocked isocyanate curing agent (B-2-2) obtained in Production Example 3-2, and then ethylene glycol mono-2-ethylhexyl ether was added in an amount of 3% (15 parts) based on the solid content. Next, the mixture was neutralized by adding formic acid in such a manner that the addition amount corresponded to a resin neutralization ratio of 40%, the mixture was slowly diluted by adding ion-exchanged water, and methyl isobutyl ketone was then removed under a reduced pressure so that the solid content was 40%, thereby affording a resin emulsion 1 (film forming resin 1).

Example 1

To 110.1 parts of ion-exchanged water was added 56.7 parts by mass of the pigment dispersion resin obtained in Production Example 1, followed by stirring at room temperature and 1000 rpm for 1 hour. Thereafter, 8 parts of carbon black, which is a pigment, and 86.6 parts of Satintone (calcined kaolin) were added, and then stirred at 2000 rpm at 40° C. for 1 hour using a sand mill, affording a pigment paste having a solid concentration of 47% by mass.

A stainless steel container was charged with 1997 parts of ion-exchanged water, 1539 parts of the resin emulsion 1 of Production Example 4-1, 436 parts of the pigment paste prepared above, and 0.05 parts by mass of silicone compound 1 (based on 100 parts by mass of the resin solid content of the resin emulsion), which were then mixed and aged at 40° C. for 16 hours, and thus a cationic electrodeposition coating composition was prepared.

Examples 2 to 4

Cationic electrodeposition coating compositions were prepared in the same manner as in Example 1 except that the silicone compound 1 was used in the amounts shown in Table 1.

Examples 5 to 8

Cationic electrodeposition coating compositions were prepared in the same manner as in Example 1 except that silicone compound 2 was used instead of the silicone compound 1 and the silicone compound 2 was used in the amounts shown in Table 1.

Comparative Examples 1 to 8

In Comparative Examples 1 to 4, cationic electrodeposition coating compositions were prepared in the same manner as in Example 1 except that the silicone compounds shown in Table 1 were used in the amounts shown in Table 2.

In Comparative Examples 5 and 6, cationic electrodeposition coating compositions were prepared in the same manner as in Example 1, except that an acrylic resin (SP=11.5) made up of methyl methacrylate, n-butyl acrylate, and hydroxyethyl methacrylate was used as an anti-cissing agent in the amounts shown in Table 2. In Table 2, the items showing the amounts of silicone compounds are the amounts of the acrylic resin (solid content) per 100 parts by mass of the resin solid content of the resin emulsions.

The following evaluations were carried out using the cationic electrodeposition coating compositions obtained in Examples and Comparative Examples. The results of the evaluations are shown in the following tables.

Formation of Cured Electrodeposition Coating Film

A cold-rolled steel sheet (JIS G3141, SPCC-SD) was immersed in SURFCLEANER EC90 (produced by Nippon Paint Surf Chemicals Co., Ltd.) at 50° C. for 2 minutes, thereby being degreased. Next, the steel sheet was immersed in SURFFINE GL1 (produced by Nippon Paint Surf Chemicals Co., Ltd.) at room temperature for 30 seconds, and immersed in SURFDYNE EC3200 (produced by Nippon Paint Surfchemicals, Zirconium conversion agent) at 35° C. for 2 minutes. The steel sheet was then rinsed with deionized water.

To the cationic electrodeposition coating composition obtained above, a required amount of 2-ethylhexyl glycol was added such that the electrodeposition coating film had a thickness of 20 μm after curing.

Thereafter, the steel sheet was fully embedded in the electrodeposition coating composition, and application of a voltage was then immediately started. The voltage was applied under such a condition that the voltage was raised for 30 seconds to 180 V, and the steel sheet was held for 150 seconds. Thus, an uncured electrodeposition coating film was deposited on the article to be coated (cold-rolled steel sheet). The resulting uncured electrodeposition coating film was heated and cured at 160° C. for 15 minutes, affording an electrodeposition coated sheet having a cured electrodeposition coating film having a thickness of 20 μm.

Evaluation of Anti-Cissing Property (Bumping Oil Cissing Property)

On the uncured coating film obtained by depositing an uncured electrodeposition coating film on the article to be coated (cold-rolled steel sheet), a small container made of aluminum was placed. Then, water and lubricating oil were put in the container and the uncured coating film was baked and cured at 160° C. for 15 minutes. Other electrodeposition conditions were the same as those of the formation of the cured electrodeposition coating film prepared in the appearance evaluation described above.

During this baking, the oil in the small container is scattered on the electrodeposition coating film. The oil scattering can cause cissing (bumping oil cissing). In addition, the evaluation of the bumping oil cissing property is supposed to evaluate the anti-cissing property of the cationic electrodeposition coating composition after coating.

The state of the cured electrodeposition coating film heat-cured under the conditions described above was visually observed and evaluated according to the following criteria.

⊚: The number of cissing is 3 or less.
○: The number of cissing is 4 or more and 10 or less.
○Δ: The number of cissing is 11 or more and 15 or less.
Δ: The number of cissing is 16 or more and 30 or less.
x: The number of cissing is 30 or more.

Evaluation of Anti-Cissing Property (Mixed Oil Cissing Property)

A 10%-butyl cellosolve solution was prepared as an oil. The solution was mixed in 10 L of an electrodeposition coating composition such that the concentration of the oil was 50 ppm, and the mixture was stirred at 500 rpm for 24 hours.

An L-shaped steel sheet prepared by folding a steel sheet into an L-shape was placed such that at least the horizontal part (5 cm long) of the steel sheet was immersed in the electrodeposition coating composition. At this time, the L-shaped steel sheet was arranged such that the horizontal part of the L-shaped steel sheet was horizontal to the liquid surface of the electrodeposition coating composition and the vertical part of the L-shaped steel sheet was vertical to the liquid surface of the coating composition. The L-shaped steel sheet was electrodeposited such that the dry coating film had a thickness of 20 μm, and thus an uncured coating film was formed.

The resulting uncured coating film was baked and cured at 160° C. for 15 minutes. Other electrodeposition conditions were the same as those of the formation of the cured electrodeposition coating film prepared in the appearance evaluation described above. The evaluation of the mixed oil cissing property is supposed to evaluate the anti-cissing property of the cationic electrodeposition coating composition before coating and during coating.

The coating film surface on the lower surface of the horizontal part of the L-shaped steel sheet was visually observed, the number of cissing was counted, and evaluated according to the following evaluation criteria.

⊚: There is no cissing.
○: The number of cissing is 3 or less.
○Δ: The number of cissing is 4 or more and 10 or less.
Δ: The number of cissing is 11 or more and 15 or less.
x: The number of cissing is 16 or more.

Appearance Evaluation (Visual Evaluation)

For electrodeposition coated plates having an electrodeposition coating film obtained from the above-described electrodeposition coated plates, whether there are irregularities or not in the coating film appearance was visually evaluated. The evaluation criteria were as follows.

Evaluation Criteria

○: The coated plate has a uniform coating film appearance;
○Δ: The coated plate has an almost uniform coating film appearance as a whole, although there are some areas that are visually recognized as slightly uneven.
Δ: The coating film appearance is not uniform.
x: The coating film appearance is extremely ununiform.

Appearance Evaluation (Ra(2.5))

Using SJ-210 (manufactured by Mitsutoyo), the arithmetic average roughness (Ra(2.5)) of a coating film surface (excluding wavelengths of 2.5 mm or more) was measured. The thickness of the coating film was 20 μm, the measurement was performed 5 times, and the average thereof was taken.

The measurement conditions were a cutoff wavelength of 2.5 mm or more and a scanning speed of 0.5 mm/sec.

Storage Stability of Electrodeposition Coating Composition (Coating Material Stability)

The electrodeposition coating compositions obtained in Examples 1 to 8 and Comparative Examples 1 to 6 were stored at 40° C. for 1 month. The filterability of the coating compositions after storage was judged based on the following criteria, and the storage stability of the electrodeposition coating compositions was evaluated. In this test, it is judged that the storage stability is high when the filterability evaluation is "◯".

◯: The coating composition easily passes through 508 mesh (manufactured by NBC Mesh Tech: N-NO.508S, opening: 20 μm).

Δ: The coating composition takes some time to pass through 508 mesh, but there is no problem in manufacturing work.

x: The coating composition cannot pass through 508 mesh, which causes a problem in manufacturing work.

Dispersibility Evaluation

To 99 g of ion-exchanged water was added 1 g of the silicone compound, and the mixture was stirred at 23° C. at a speed of 1000 rpm for 1 hour. After the stirring, the system was allowed to stand at room temperature for 24 hours, and then the state of the system was observed. Evaluation criteria are as follows.

⊙: There is no turbidity.
◯: Although the system is cloudy, it is not phase-separated and is uniformly dispersed.
Δ: The system was cloudy, and some phase separation was observed.
x: The system was completely phase-separated.

TABLE 1

| | | Example 1 | Example 2 | Example 3 | Example 4 | Example 5 | Example 6 | Example 7 | Example 8 |
|---|---|---|---|---|---|---|---|---|---|
| Resin emulsion | | 1 | 1 | 1 | 1 | 1 | 1 | 1 | 1 |
| Film forming resin | Aminated resin (B-1-1) (parts by mass) | 350 | 350 | 350 | 350 | 350 | 350 | 350 | 350 |
| | Curing agent (B-2-1) (parts by mass) | 75 | 75 | 75 | 75 | 75 | 75 | 75 | 75 |
| | Curing agent (B-2-2) (parts by mass) | 75 | 75 | 75 | 75 | 75 | 75 | 75 | 75 |
| Additives | Silicone compound 1  SP = 12.7 | ◯ | ◯ | ◯ | ◯ | | | | |
| | Silicone compound 2  SP = 14.8 | | | | | ◯ | ◯ | ◯ | ◯ |
| | Silicone compound 3  SP = 10.0 | | | | | | | | |
| | Silicone compound 4  SP = 15.3 | | | | | | | | |
| Amount | Amount of silicone compound per 100 parts by mass of resin solid content | 0.05 | 0.3 | 1.5 | 3 | 0.05 | 0.3 | 1.5 | 3 |
| Performance | Cissing  Bumping | ◯ | ◯ | ◯ | ⊙ | ◯ | ◯ | ⊙ | ⊙ |
| | Mixed | ◯Δ | ◯ | ◯ | ⊙ | ◯Δ | ◯ | ◯ | ⊙ |
| | Appearance  Visually observed | ◯ | ◯ | ◯Δ | ◯Δ | ◯Δ | ◯Δ | ◯Δ | ◯Δ |
| | Ra (2.5) | 0.15 | 0.21 | 0.26 | 0.28 | 0.16 | 0.2 | 0.26 | 0.29 |
| | Coating material stability | ◯ | ◯ | ◯ | ◯ | ◯ | ◯ | ◯ | ◯ |
| | Dispersibility evaluation | ◯ | ◯ | ◯ | ◯ | ◯ | ◯ | ◯ | ⊙ |

TABLE 2

| | | Comparative Example 1 | Comparative Example 2 | Comparative Example 3 | Comparative Example 4 | Comparative Example 5 | Comparative Example 6 |
|---|---|---|---|---|---|---|---|
| Resin emulsion | | 1 | 1 | 1 | 1 | 1 | 1 |
| Film forming resin | Aminated resin (B-1-1) (parts by mass) | 350 | 350 | 350 | 350 | 350 | 350 |
| | Curing agent (B-2-1) (parts by mass) | 75 | 75 | 75 | 75 | 75 | 75 |
| | Curing agent (B-2-2) (parts by mass) | 75 | 75 | 75 | 75 | 75 | 75 |
| Additives | Silicone compound 1  SP = 12.7 | ◯ | | | | Acrylic resin SP = 11.5 | Acrylic resin SP = 11.5 |
| | Silicone compound 2  SP = 14.8 | | ◯ | | | | |
| | Silicone compound 3  SP = 10.0 | | | ◯ | | | |
| | Silicone compound 4  SP = 15.3 | | | | ◯ | | |
| Amount | Amount of silicone compound per 100 parts by mass of resin solid content | 5 | 5 | 0.3 | 0.3 | 0.05 | 3 |

TABLE 2-continued

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Performance | Cissing | Bumping | ⊙ | ⊙ | ⊙ | Δ | X | ◯ |
|  |  | Mixed | ⊙ | ⊙ | ⊙ | X | X | Δ |
|  | Appearance | Visually observed | X | X | ◯Δ | ◯ | ◯ | X |
|  |  | Ra (2.5) | 0.35 | 0.37 | 0.27 | 0.21 | 0.22 | 0.31 |
|  | Coating material stability |  | ◯ | ◯ | X | ◯ | ◯ | X |
|  | Dispersibility evaluation |  | ◯ | ⊙ | X | ⊙ | Δ | Δ |

As described above, the coating composition of the present disclosure can exhibit good anti-cissing property even when the mechanisms of the existence (mixing) of oil are different, such as bumping oil cissing and mixed oil cissing. Therefore, for example, it is possible to show a good anti-cissing property with respect to an oil component derived from an apparatus used in a coating process such as an indirect furnace or a drying furnace, and further, even if an oil component is mixed in the coating composition, it is good. Repelling resistance can be exhibited.

Also, the dispersibility of the coating composition in water (aqueous solvent) is good, and the load on the environment can be reduced.

Moreover, the resulting electrodeposition coating film can exhibit good appearance. Moreover, since the electrodeposition coating composition of the present disclosure has good coating material stability, for example, stability in an aqueous system, disposal thereof can be suppressed and environmental load can be reduced.

Furthermore, applying a known coating composition, e.g., a topcoat coating composition to an electrodeposition coating film formed from the cationic electrodeposition coating composition of the present disclosure and then curing the applied composition made the electrodeposition coating film and the topcoat coating film possible to exhibit good adhesion.

On the other hand, in Comparative Examples 1 and 2, the SP value of the silicone compound is within the range of the present invention. However, the amount of the silicone compound per 100 parts by mass of the resin solid content is outside the range of the present invention. It can be seen that such a silicone compound is remarkably inferior in appearance. Therefore, the coating film appearance was extremely ununiform, and it was not possible to achieve both good anti-cissing property and good coating film appearance.

In Comparative Example 3, since the SP value of the silicone compound was outside the range of the present invention, the coating material stability was poor and the workability was poor. Further, the dispersibility in water (aqueous solvent) was insufficient.

In Comparative Example 4, since the SP value of the silicone compound was outside the range of the present invention, the anti-cissing performance was insufficient, and it was not possible to achieve both good anti-cissing property and good appearance.

Comparative Examples 5 and 6 are comparative examples in which the silicone compound according to the present invention was replaced with an acrylic resin having an SP value within the range of the present invention, and the amount thereof was adjusted within the range of the present invention. However, neither comparative example could have a good balance of anti-cissing property, good appearance and coating material stability. Rather, these effects tend to be inferior.

INDUSTRIAL APPLICABILITY

The cationic electrodeposition coating composition according to the present disclosure can form a cationic electrodeposition coating film having both good anti-cissing property and good coating film appearance. Furthermore, the cationic electrodeposition coating composition according to the present disclosure can exhibit good coating material stability.

The invention claimed is:

1. A method for forming a cured electrodeposition coating film, comprising: forming an uncured electrodeposition coating film by immersing an article to be coated in a cationic electrodeposition coating composition and performing electrodeposition coating; and heat-curing the uncured electrodeposition coating film to form the cured electrodeposition coating film on the article, wherein the cationic electrodeposition coating composition comprises:

a silicone compound (A) having a solubility parameter SP value of more than 10.5 and 15.0 or less, and a film forming resin (B), wherein the silicone compound (A) is contained in an amount of 0.01 parts by mass or more and 4.5 parts by mass or less per 100 parts by mass of a resin solid content of the film forming resin (B).

2. The method for forming a cured electrodeposition coating film according to claim 1, wherein the SP value of the silicone compound (A) of the cationic electrodeposition coating composition is 12.0 or more and 15.0 or less.

3. The method for forming a cured electrodeposition coating film according to claim 1, wherein the silicone compound (A) of the cationic electrodeposition coating composition is at least one species selected from the group consisting of a polyether modified silicone compound (A-1), a polyester modified silicone compound (A-2), and a polyacrylic modified silicone compound (A-3).

4. The method for forming a cured electrodeposition coating film according to claim 1, wherein the silicone compound (A) is contained in an amount of 0.04 parts by mass or more and 4.5 parts by mass or less per 100 parts by mass of the resin solid content of the film forming resin (B) in the cationic electrodeposition coating composition.

5. The method for forming a cured electrodeposition coating film according to claim 1,
wherein the silicone compound (A) of the cationic electrodeposition coating composition is soluble or dispersible in an aqueous solvent.

\* \* \* \* \*